3,084,128
COATING COMPOSITION COMPRISING MICRO-CRYSTALLINE WAX, POLYISOBUTYLENE, POLYETHYLENE AND A RESIN, AND ALUMINUM FOIL COATED THEREWITH
James E. Stillwagon, Pittsburgh, Pa., assignor to Aluminum Company of America, Pittsburgh, Pa., a corporation of Pennsylvania
No Drawing. Filed Aug. 17, 1959, Ser. No. 833,906
9 Claims. (Cl. 260—4)

This invention relates to improvements in coating compositions for use as a heat seal coating, and further to flexible wrapping materials having a coating thereon adapted to provide a heat seal particularly for aluminum foil.

Microcrystalline wax is highly desirable as a surface coating in many packaging applications since the coating is relatively adhesive and flexible, and resistant to moisture vapor transmission. The coating also provides a heat seal means whereby overlapped margins of the waxed sheet material may be sealed upon application of heat. However, microcrystalline wax, particularly one having a relatively low melting point, has a tendency to be soft and tacky thereby making waxed sheet material difficult to handle prior to sealing. That is, when such material is wound in rolls or stacked in layers, the wax composition is of such character that the coating will cause adjacent layers in the roll or stack to stick together or "block," thereby damaging the coating upon separation and rendering the sheet material unsatisfactory for use. A higher melting point microcrystalline wax, being relatively harder, may possess sufficient blocking resistance, but exhibits poor adhesion for the base material.

Microcrystalline wax, as generally referred to herein, is the high boiling (residual) fraction obtained in the process of de-waxing lubricating oils, and is characterized by its microcrystalline structure, high melting point ranging from about 130° F. to 210° F. or higher and high degree of plasticity. Microcrystalline wax is to be distinguished from paraffin wax which is derived from more volatile and lighter fractions in the distillation of petroleum and is markedly crystalline and brittle as compared to microcrystalline wax.

It is an object of this invention to provide a heat sealable coating for flexible wrapping materials which will retain a strong bond when sealed by heat and pressure, and at the same time be resistant to blocking.

It is another object of this invention to provide a coating of the above type particularly adapted for use as a heat seal coating for aluminum foil or foil-paper laminate.

The heat sealable coating composition of the present invention comprises, as its principal constituent, a high melting point microcrystalline wax, and additives to improve its anti-blocking characteristics as well as its adhesive properties for the hard smooth aluminum foil used extensively in overwrap structures. To attain these qualities, the wax base coating has blended therewith polyisobutylene and polyethylene both of a relatively high molecular weight, a resin and preferably also cyclized rubber in regulated proportions. Conventional wax coating equipment may be used to apply the coating as a hot melt to one or both sides of the aluminum foil, or to foil laminated with paper or other suitable web material, on either the foil side or the web material side, or both sides. The amount necessary to coat the foil surface, or the paper surface in foil-paper laminate for example, for proper coverage so as to obtain good sealing, may vary considerably with the use to which it is put or with the type of web or paper employed. The coatings produced are non-blocking at 120° F. under one pound pressure per square inch per 24 hours (A.S.T.M. D 1146–53, with 0.001 inch high purity aluminum foil substituted for the filter paper). Further, bonds formed between aluminum foil and paper coated with my improved formulation have a stripping strength of up to about 0.3 pound per square inch, using 2 inches per minute pull at 180° when stripping the foil from the paper (A.S.T.M. 903–49).

Microcrystalline wax, employed as the principal constituent in my new improved heat seal composition, is present in amounts of from about 70 to 90% by weight. As pointed out above, microcrystalline wax is tacky and therefore has a tendency to block, this tendency being more severe with the softer, lower melting waxes. On the other hand, a hard wax possesses inadequate sealing strength in that aluminum foil bonded to an opposing member by means of a hard microcrystalline wax may be readily stripped from the other member. In addition, a hard wax, having a brittle quality, tends to crack or flake. In my improved heat sealable coating composition, however, a microcrystalline wax having a melting point of from about 170 to 195° F. and a hardness of about 2 to 20, needle point penetration at 77° F. (A.S.T.M. D 1321–57T), has proven most suitable.

The disadvantages attributable to the characteristics of the microcrystalline wax are overcome in part by adding to the wax base 3 to 9% polyisobutylene having a molecular weight of at least 30,000, and preferably 80,000 or higher. The polyisobutylene enhances the adhesive properties of the coating and also improves its water vapor transmission resistance. The addition of polyisobutylene to microcrystalline wax may reduce somewhat the blocking resistance of the wax, and employing more than the preferred range may adversely affect the anti-blocking properties of the coating.

Further, to improve generally the anti-blocking properties of the coating composition, about 3 to 20% of polyethylene is included in the composition. The polyethylene should have a molecular weight of at least 6,000, and preferably 18,000 or higher. Although polyethylene of low molecular weight permits a better heat seal, employing polyethylene having a lower molecular weight than described is not suitably effective in improving blocking resistance. On the other hand, a very high molecular weight polyethylene is difficult to blend with the microcrystalline wax. Employing polyethylene within the proportions described also improves the gloss retention and internal strength of the coating, but amounts substantially in excess of 20% results in a loss in adhesion particularly to foil surfaces.

Many wrapping applications for aluminum foil require printing or other decorative matter on the exterior foil surface, the printing in turn being protected from scuffing and the like by an overlacquer such as vinyl or nitrocellulose lacquer. Hence, in overlapped margins of the wrapping material there may exist a bond between the lacquer coating and the heat seal coating. The bond between a heat seal coating (comprising merely microcrystalline wax, polyisobutylene and polyethylene) and the lacquered surface tends to "pop" or burst apart freely once the seal is broken. However, I provide in my improved coating composition from about 2 to 8% of a resin selected from the group consisting of rosin esters and terpenes. The resin counteracts "popping" and improves adhesion of the heat seal coating to the wrapping material. The terpene employed preferably has a melting point above about 155° F. Rosin esters that may be employed, for example, include glycerol ester of rosin, methyl ester of rosin, ethylene glycol ester of rosin, pentaerythritol ester of rosin, including the modified derivatives, and the hydrogenated and polymerized derivatives, for example glycerol ester of hydrogenated rosin or glycerol ester of polymerized rosin.

Adhesion may be further improved by adding to the coating up to about 2% by weight of cyclized rubber. This material is particularly advantageous in a coating employing a substantial percentage of microcrystalline wax having a relatively high melting point. With the somewhat softer flexible waxes having a lower melting point, the cyclized rubber may be decreased proportionately or be omitted altogether. The amount of cyclized rubber incorporated in the coating may therefore range up to about 2%.

As pointed out above, the coating composition having the above designated combination of constituents exhibits high anti-blocking characteristics and further provides a good heat seal between opposing surfaces, one such surface being aluminum foil. The advantages are readily demonstrated in the following comparisons wherein in each case the microcrystalline wax employed was of the preferred melting point and hardness, and the polyethylene and polyisobutylene were of the preferred molecular weight:

A microcrystalline wax coating having a melting point of about 170 to 175° F. had a low stripping strength of less than 0.1 pound per square inch, and showed moderate to excessive blocking at 100° F. Where the wax base composition contained 10% polyethylene and 8% polyisobutylene, the blocking resistance was improved but the stripping strength was still low at less than 0.1 pound per square inch. A coating composition in accordance with my invention which I have found particularly satisfactory was made up of 75% of the microcrystalline wax, 15% polyethylene, 5% polyisobutylene and 5% Piccolyte S-70 (a terpene resin having a melting point of 158° F.). It was found that this coating had a stripping strength of 0.3 pounds per square inch, and at the same time was non-blocking at 120° F.

As a further comparison to illustrate the advantages of my coating composition, a hard microcrystalline wax having a melting point of about 190 to 195° F. did not block when tested at 120° F., but showed substantially zero stripping strength. This composition was compared to one with the same base and about 32% microcrystalline wax having a melting point of about 170 to 175° F., 8% polyisobutylene and 5% polyethylene. The stripping strength was increased to about 0.2 pound per square inch but the blocking resistance decreased greatly, the coating blocked at 100° F. A specific formula which I found satisfactory from my invention was made up of about 64% microcrystalline wax having a melting point of about 190 to 195° F., 22% microcrystalline wax having a melting point of about 170 to 175° F., 5% polyisobutylene, 5% polyethylene, 1% cyclized rubber and 3% Staybelite Ester 10 (a glycerol ester of hydrogenated rosin). This coating composition had a stripping strength of 0.2 pound per square inch and showed no blocking at 120° F. Substituting Poly-pale Ester 1 (an ethylene glycol ester of polymerized rosin) for the Staybelite Ester 10 in this formula increased the stripping strength of the coating to 0.3 pound per square and further showed no blocking.

Having described my invention, I claim:

1. A composition for use as a heat seal coating comprising by weight 70 to 90% microcrystalline wax having a melting point of about 170 to 195° F., 3 to 9% polyisobutylene having a molecular weight above about 30,000, 3 to 20% polyethylene having a molecular weight above about 6,000, and 2 to 8% of a resin selected from the group consisting of rosin esters and terpenes, said coating being characterized by the ability to adhere to aluminum foil and further by resistance to blocking at 120° F.

2. A composition for use as a heat seal coating comprising by weight approximately 64% microcrystalline wax having a melting point of about 190 to 195° F., 22% microcrystalline wax having a melting point of about 170 to 175° F., 5% polyisobutylene of a molecular weight of above about 80,000, 5% polyethylene of a molecular weight of above about 18,000, 1% cyclized rubber, and 3% glycerol ester of hydrogenated rosin, said coating being characterized by the ability to adhere to aluminum foil and further by resistance to blocking at 120° F.

3. A composition for use as a heat seal coating comprising by weight approximately 64% microcrystalline wax having a melting point of about 190 to 195° F., 22% microcrystalline wax having a melting point of about 170 to 175° F., 5% polyisobutylene of an molecular weight of above about 80,000, 5% polyethylene of a molecular weight of above about 18,000, 1% cyclized rubber, and 3% ethylene glycol ester of polymerized rosin, said coating being characterized by the ability to adhere to aluminum foil and further by resistance to blocking at 120° F.

4. A composition for use as a heat seal coating comprising by weight approximately 75% microcrystalline wax of a melting point of about 170° F., 5% polyisobutylene of a molecular weight of above about 80,000, 15% polyethylene of a molecular weight of above about 18,000, and 5% of a terpene having a melting point of not less than 155° F., said coating being characterized by the ability to adhere to aluminum foil and further by resistance to blocking at 120° F.

5. A flexible wrapping material comprising aluminum foil and a heat seal coating for said material, said coating comprising by weight 70 to 90% microcrystalline wax of a melting point of about 170 to 195° F., 3 to 9% polyisobutylene of a molecular weight of above about 30,000, 3 to 20% polyethylene of a molecular weight of above about 6,000, up to about 2% cyclized rubber, and 2 to 8% of a resin selected from the group consisting of rosin esters and terpenes, said coating characterized by adhesion to aluminum foil and further by resistance to blocking.

6. A flexible wrapping material comprising aluminum foil and a heat seal coating for said material, said coating comprising by weight approximately 64% microcrystalline wax having a melting point of about 190 to 195° F., 22% microcrystalline wax having a melting point of about 170 to 175° F., 5% polyisobutylene having a molecular weight above about 80,000, 5% polyethylene having a molecular weight above about 18,000, 1% cyclized rubber, and 3% glycerol ester of hydrogenated rosin, said coating being characterized by the ability to adhere to aluminum foil and further by resistance to blocking at 120° F.

7. A flexible wrapping material comprising aluminum foil and a heat seal coating for said material, said coating comprising by weight approximately 64% microcrystalline wax having a melting point of about 190 to 195° F., 22% microcrystalline wax having a melting point of about 170 to 175° F., 5% polyisobutylene having a molecular weight above about 80,000, 5% polyethylene having a molecular weight above about 18,000, 1% cyclized rubber, and 3% ethylene glycol ester of polymerized rosin, said coating being characterized by the ability to adhere to aluminum foil and further by resistance to blocking at 120° F.

8. A flexible wrapping material comprising aluminum foil and a heat seal coating for said material, said coating comprising by weight approximately 75% microcrystalline wax having a melting point of about 170 to 175° F., 5% polyisobutylene having a molecular weight of above about 80,000, 15% polyethylene having a molecular weight of above about 18,000 and 5% terpene having a melting point of not less than 155° F., said coating being characterized by the ability to adhere to aluminum foil and further by resistance to blocking at 120° F.

9. A flexible wrapping material comprising aluminum foil having a protective lacquer coating on one surface and a heat seal coating for said material, said heat seal coating comprising by weight approximately 70 to 90% microcrystalline wax having a melting point of about 170 to 195° F., 3 to 9% polyisobutylene having a molecular weight of above about 30,000, 3 to 20% polyethylene having a molecular weight of above about 6,000, up to 2% cyclized rubber, and 2 to 8% of a resin selected from the group consisting of rosin esters and terpenes, said heat seal coating characterized by the ability to adhere to said lacquered surface and further by resistance to blocking at 120° F.

References Cited in the file of this patent
UNITED STATES PATENTS

| | | |
|---|---|---|
| 2,319,959 | Tierney | May 25, 1943 |
| 2,337,908 | Mack | Dec. 28, 1943 |
| 2,339,958 | Sparks | Jan. 25, 1944 |
| 2,388,984 | Mack | Nov. 13, 1945 |
| 2,606,120 | Cherepow et al. | Aug. 5, 1952 |
| 2,770,609 | Symonds | Nov. 13, 1956 |
| 2,825,709 | Sturm | Mar. 4, 1958 |
| 2,969,340 | Kaufman et al. | Jan. 24, 1961 |